(12) United States Patent
Matsumura et al.

(10) Patent No.: US 11,368,975 B2
(45) Date of Patent: Jun. 21, 2022

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 62 days.

(21) Appl. No.: 16/767,763

(22) PCT Filed: Nov. 21, 2018

(86) PCT No.: PCT/JP2018/042939
§ 371 (c)(1),
(2) Date: May 28, 2020

(87) PCT Pub. No.: WO2019/107239
PCT Pub. Date: Jun. 6, 2019

(65) Prior Publication Data
US 2020/0359405 A1    Nov. 12, 2020

(30) Foreign Application Priority Data
Nov. 29, 2017  (JP) .............................. JP2017-241134

(51) Int. Cl.
*H04W 4/00* (2018.01)
*H04W 72/12* (2009.01)
(Continued)

(52) U.S. Cl.
CPC ....... *H04W 72/1289* (2013.01); *H04L 5/0055* (2013.01); *H04W 72/042* (2013.01); *H04W 72/0413* (2013.01); *H04W 72/0446* (2013.01)

(58) Field of Classification Search
CPC ......... H04W 72/1289; H04W 72/0413; H04W 72/042; H04W 72/0446; H04W 28/04;
(Continued)

(56) References Cited

U.S. PATENT DOCUMENTS

2013/0022017 A1* 1/2013 Han .................... H04L 27/2636
370/329
2013/0136071 A1* 5/2013 Han ..................... H04L 5/0053
370/329
(Continued)

OTHER PUBLICATIONS

Examination Report issued in Pakistani Application No. 807/2018, dated Aug. 12, 2019 (2 pages).
(Continued)

*Primary Examiner* — Mang Hang Yeung
(74) *Attorney, Agent, or Firm* — Osha Bergman Watanabe & Burton LLP

(57) ABSTRACT

A terminal is disclosed including a receiver that receives multiple downlink control information for scheduling downlink shared channels in a plurality of downlink control channels; and a processor that determines an uplink control channel resource for a delivery acknowledgement information based on a control channel element (CCE) index of a downlink control channel corresponding to a specific downlink control information when the delivery acknowledgement information for the multiple downlink control information is transmitted in a same slot, wherein the uplink control channel resource is based on a resource indication field in the specific downlink control information, and wherein the specific downlink control information is a last downlink control information in a time order of the multiple downlink control information. In other aspects, a communication method for a terminal and a base station are also disclosed.

5 Claims, 12 Drawing Sheets

(51) Int. Cl.
*H04L 5/00* (2006.01)
*H04W 72/04* (2009.01)

(58) Field of Classification Search
CPC .... H04W 72/04; H04W 72/12; H04L 5/0055; H04L 5/005; H04L 5/0053
USPC .......................................................... 370/329
See application file for complete search history.

(56) References Cited

U.S. PATENT DOCUMENTS

| | | | | |
|---|---|---|---|---|
| 2013/0182627 A1* | 7/2013 | Lee | ........................ | H04L 5/0016 370/311 |
| 2013/0182676 A1* | 7/2013 | Lee | ......................... | H04L 5/001 370/329 |
| 2017/0164347 A1 | 6/2017 | Han et al. | | |

OTHER PUBLICATIONS

Examination Report issued in Bangladeshi Application No. 323/2018/1483, dated Nov. 12, 2019 (1 page).
3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).
3GPP TSG RAN WG1 Meeting #70bis; R1-124223 "Remaining details of PUCCH resource allocation for EPDCCH" New Postcom; San Diego, USA; Oct. 8-12, 2012 (6 pages).
3GPP TSG RAN WG1 Meeting #90; R1-1712740 "PUCCH resource allocation" Fujitsu; Prague, Czech Republic; Aug. 21-25, 2017 (4 pages).
3GPP TSG RAN WG1 Meeting #92; R1-1803237 "Summary of RAN1#92 Tdocs on PUCCH resource allocation" OPPO; Athens, Greece; Feb. 26-Mar. 2, 2018 (10 pages).
International Search Report issued in International Application No. PCT/JP2017/042939, dated Dec. 18, 2018 (5 pages).
Written Opinion issued in International Application No. PCT/JP2018/042939; dated Dec. 18, 2018 (5 pages).
Extended European Search Report issued in counterpart European Patent Application No. 18882974.1, dated Aug. 9, 2021 (10 pages).
Office Action issued in Taiwanese Application No. 107142368; dated Mar. 2, 2022 (21 pages).

* cited by examiner

| PUCCH FORMAT | NUMBER OF SYMBOLS IN SLOT | NUMBER OF BITS | Pre-DFT OCC |
|---|---|---|---|
| 0 | 1-2 | ≤2 | N.A. |
| 1 | 4-14 | ≤2 | N.A. |
| 2 | 1-2 | >2 | N.A. |
| 3 | 4-14 | >2 | No |
| 4 | 4-14 | >2 | Yes |

FIG. 2

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). For further broadbandization and increased speed beyond LTE Further, successor systems to LTE (for example, LTE-A (LTE-Advance), FRA (Future Radio Access), 4G, 5G, 5G+(plus), NR (Mew Rat), LTE Rels. 14, 15 or later versions) are under study.

In existing LTE systems (for example, LTE Rels. 8 to 13), downlink (DL) and/or uplink (UL) communications are performed using subframes of 1 ms (also referred to as "Transmission Time Interval (TTI)). Such a subframe is a transmission time unit of one data packet subjected to channel coding and is also used as a processing unit for scheduling, link adaptation retransmission control (HARQ: Hybrid Automatic Repeat request).

Also, in existing LTE systems (for example, LTE Rels. 8 to 13), the user terminal transmit unlink control information (UCI) using an uplink control channel (PUCCH: Physical Uplink Control Channel) or an uplink data channel (PUSCH: Physical Uplink Shared Channel). This uplink control channel format is called PUCCH format (PF) or the like.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In the existing LTE systems (for example, LTE Rel. 13 or earlier versions), uplink control channels of multiple formats (for example, LTE PUCCH formats 1 to 5, etc.) having the same duration (for example, 14 symbols in normal cyclic prefix (CP)) are supported. On the other hand, in future radio communication systems (for example, LTE Rel. 14, 15 or later, 5G, NR, etc.), uplink control channels of multiple formats at least having different durations are expected to be supported.

For example, in the future radio communication systems, consideration is given to supporting a first uplink control channel having a relatively short duration (for example, 1 or 2 symbols) (such a channel is also referred to as short PUCCH, NR PUCCH format 0 and/or 2 or the like) and a second uplink control channel having a longer duration than the first uplink control channel (for example, 4 to 14 symbols) (such a channel is hereinafter referred to as long PUCCH, at least one of NR PUCCH format 1, 3 and 4, or the like).

Thus, it is assumed that if uplink control channels of multiple formats at least having different durations are supported, UCI transmission control in the existing LTE systems (for example, LTE Rel. 13 or earlier versions) is not adapted, as uplink control channels of the same duration are only supported in the existing LTE systems.

The present invention was carried out in view of the foregoing and it is therefore an object of the present invention to provide a user terminal and a radio communication method that transmit uplink control information appropriately in future radio communication systems.

Solution to Problem

An aspect of the present invention provides a user terminal comprising: a receiving section that detects multiple downlink control information for scheduling downlink shared channels in a plurality of downlink control channels; and a control section that, when delivery acknowledgement information for the multiple downlink control information is transmitted in a same slot, determines an uplink control channel resource for the delivery acknowledgment information based on a control channel element (CCE) index of a downlink control channel corresponding to last specific downlink control information in a time order of the multiple downlink control information and a resource indication field in the specific downlink control information.

Advantageous Effects of Invention

According to the present invention, it is possible to transmit uplink control information in a suitable manner in future radio communication systems.

BRIEF DESCRIPTION OF DRAWINGS

FIG. 2 is a diagram illustrating an example of PUCCH format in future radio communication systems;

DESCRIPTION OF EMBODIMENTS

In the existing LTE systems (for example, LTE Rel. 13 or earlier versions), uplink control channels (for example, PUCCH) of a plurality of formats (for example, LTE PUCCH format (LTE PF) 1 to 5, and so on) of the same duration (for example, normal cyclic prefix (CP) of 14 symbols) are supported.

In future radio communication systems (for example, LTE Rel. 15 or later versions, 5G, NR, and so on), it has been considered that UCI is transmitted using uplink control channels (for example, PUCCH) of a plurality of formats (for example, NR PUCCH formats (NR PF), also referred to as simply "PUCCH formats") at least having different durations.

Figure 1:
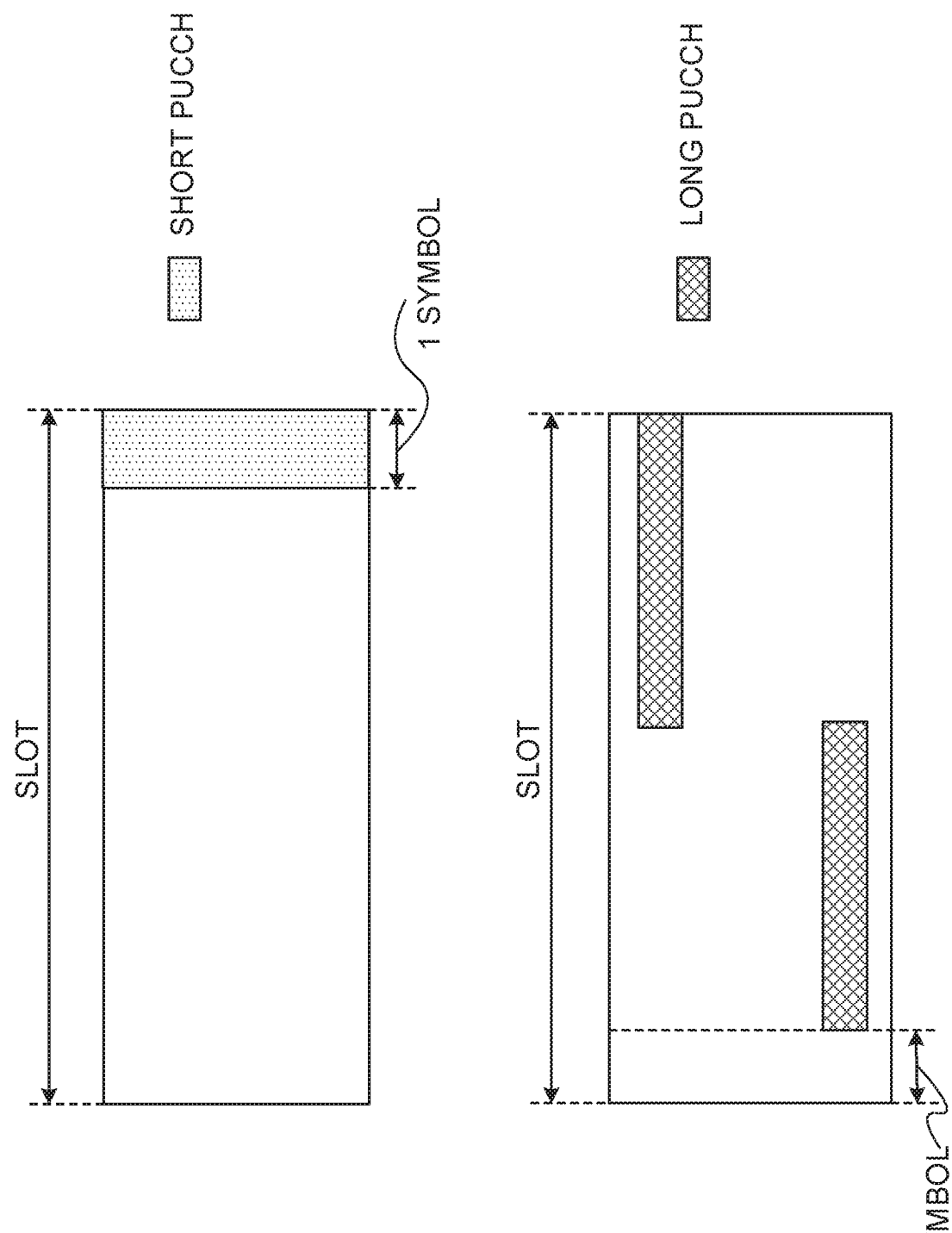
FIGS. 1A and 1B provide diagrams illustrating a configuration example of uplink control channel in future radio communication systems.

FIGS. 1A and 1B provide diagrams each illustrating an example of PUCCH in a future radio communication system. In FIG. 1A, a PUCCH (short PUCCH or first uplink control channel) is illustrated as being formed of a relatively small number of symbols (duration, for ample, 1 to 2 symbols). In FIG. 1B, a PUCCH (long PUCCH or second uplink control channel) is illustrated as being formed of a greater number of symbols than the short PUCCH (duration, for example, 4 to 14 symbols).

As illustrated in FIG. 1A, the short PUCCH may be allocated to the last given number of symbols (for example, 1 to 2 symbols). Here, the symbols for short PUCCH is not limited to the last ones of the slot, but may be first symbols of the slot or a given number of symbols in the middle of the slot. Further, the short PUCCH is allocated to one or more frequency resources (for example, one or more PRBs). In FIG. 1A, the short PUCCH is allocated to continuous PRBs, but may be allocated to discontinuous PRBs.

Further, the short PUCCH may be time-division-multiplexed and/or frequency-division-multiplexed to an uplink data channel (hereinafter referred to as PUSCH) in a slot. Furthermore, the short PUCCH may be time-division-multiplexed and/or frequency-division-multiplexed to a downlink data channel (hereinafter referred to as PDSCH (Physical Downlink Shared Channel)) and/or a downlink control channel (hereinafter referred to as PDCCH (Physical Downlink Control Channel) in a slot.

In the short PUCCH, multicarrier waveform (for example, OFDM (Orthogonal Frequency Division Multiplexing) waveform) may be used, or a single carrier waveform (for example, DFT-s-OFDM (Discrete Fourier Transform-Spread-Orthogonal Frequency Division Multiplexing) waveform) may be used.

On the other hand, as illustrated in FIG. 1B, the long PUCCH is allocated over a greater number of symbols than the short PUCCH (for example, 4 to 14 symbols). In FIG. 1B, the long PUCCH is not allocated to the first given number of symbols in a slot, but may be mapped to the first given number of symbols.

As illustrated in FIG. 1B, in order to achieve the power boosting effect, the long PUCCH may be formed of frequency resources (for example, 1 or 2 PRBs) that are less than frequency resources of the short PUCCH, or may be formed of frequency resources in the same number as the short PUCCH.

Further, the long PUCCH may be frequency-division-multiplexed to PUSCH in a slot. The long PUCCH may be time-division-multipiexed to PDCCH in a slot. The long PUCCH may be allocated to in the same slot as the short PUCCH. The long PUCCH may use the single carrier waveform (for example, DFT-s-OFDM waveform) or may use multi carrier waveform (for example, OFDM waveform).

Furthermore, as illustrated in FIG. 1B, the long PUCCH may be subjected to frequency hopping per given duration in a slot (for example, per mini (sub) slot). This frequency hopping may be performed at the timing when the number of symbols to transmit the frequency hopping becomes equal to the number of symbols to transmit after the frequency hopping (for example, 7 symbols when there are 14 symbols in a slot) or the frequency hopping may be performed at the timing when the number of symbols before the frequency hopping does not match the number of symbols after the frequency hopping (for example, between the first 6 symbols and the last 8 symbols when there are 14 symbols in a slot).

FIG. 2 is a diagram illustrating an example of PUCCH format in a future radio communication system. In FIG. 2, a plurality of PUCCH formats (NR PUCCH formats) are illustrated as having different numbers of symbols and/or different number of bits of UCI. Here, the PUCCH formats illustrated in FIG. 2 are provided for illustrative purposes only, and the contents and numbers of PUCCH formats 0 to 4 are not limited to those illustrated in FIG. 2.

For example, in FIG. 2, PUCCH format 0 provides a short PUCCH for UCI in 2 bits or less (up to 2 bits) (for example, see FIG. 1A) and is also referred to as sequence-based short PUCCH or the like. The short PUCCH carries up to 2 bit UCI in 1 or 2 symbols (for example, HARQ-ACK and/or scheduling request (SR)).

PUCCH format 1 supports a long PUCCH for UCI in 2 bits or less (for example, see FIG. 1B). The long PUCCH carries up to 2 bit UCI in 4 to 14 symbols. In PUCCH format 1, a plurality of user terminals may be code-division-multiplexed (CDM) in the same PRB by block-wise spreading) in the time domain using orthogonal cover code (OCC) and/or cyclic shift (CS).

The PUCCH format 2 supports a short PUCCH for more than 2-bit UCI (for example, see FIG. 1A). The short PUCCH carries more than 2-bit UCI in 1 or 2 symbols.

PUCCH format 3 supports a long PUCCH for more than 2-bit UCI (for example, see FIG. 1B) in which a plurality of user terminals can be multiplexed within the same PRB. This long PUCCH carries more than 2-bit UCI in 4 to 14 symbols. PUCCH. In PUCCH format 3, a plurality of user terminals may be code-division-multiplexed within the same PRB by using block spreading in the time domain using CS and/or OCC. Or, a plurality of user terminals may be multiplexed by using at last one of block spreading (in the frequency domain) before discrete Fourier transform (DFT), frequency division multiplexing (FDM), Comb-subcarriers. Further, in PUCCH format 3, OCC before DFT spreading may not be applied.

PUCCH format 4 supports a long PUCCH for more than 2-bit UCI (for example, see FIG. 1B) in which a single user terminal is multiplexed within the same PRB. This long PUCCH carries more than 2-bit UCI. PUCCH format 4 may be different from PUCCH format 3 in that a plurality of user terminals are not multiplexed in the same PRB in the PUCCH format 4. Further, In the PUCCH format 4, OCC may be applied before DFT spreading.

As explained above, in the future radio communication systems (for example, LTE Rel. 15 or later, 5G, NR, etc.), the two formats for short PUCCH (see PF 0/2 in FIG. 2) and the three formats for long PUCCH (see PF 1/3/4 in FIG. 2) are considered to be supported.

Further, consideration is made of a method for determining a PUCCH resource for carrying HARQ-ACK (ACK/NACK) in response to a PDSCH scheduled by PDCCH. The PUCCH resource may include any of a start symbol in a slot, the number of symbols, an index indicative of a start PRB (Physical Resource Block), the number of PRBs, presence or absence of frequency hopping, the second frequency resource in frequency hopping and code resource (initial cyclic shift, OCC, etc.).

For example, it has been considered that the user terminal (UE: User Equipment) is configure with PUCCH resource candidates by higher layer signaling and DCI (Downlink Control Information) indicates an index of one of the plurality of PUCCH resource candidates, and PUCCH resource parameters are derived implicitly.

For example, DCI carried by PDCCH includes ARI (Ack/nack Resource Indicator), and ARI and CCE (Control Channel Element) index of the PDCCH (starting CCE index) are used to indicate one of a plurality of PUCCH resource candidates. UE can specify a CCE index of the PDCCH by blind decoding.

For example, combination of 2-bit ARI and a remainder of a division of CCE index by 4 (CCE index mod 4) is used to be able to specify one of 16 PUCCH resource candidates. According to this method, it is possible to use much more PUCCH resource candidates, with the number of bits required for DCI being kept at two. Consequently, it is possible to reduce the probability of occurrence of blocking of PUCCH resources (the probability of collision of PUCCH resources), as compared with the case of not using CCE indexes.

However, it has not been considered how the UE determines a PUCCH resource if a plurality of PDCCHs are configured. If the UE is not able to determine a PUCCH resource appropriately, if feedback is not performed appropriately, if there is collision between PUCCH resources, or in any other cases, there may be a risk of deterioration of the performance of the radio communication system.

Then, the inventors of the present invention have considered a method how UE determines a PUCCH resource before a plurality of PDCCHs are configured, and achieved the present invention.

The following description is made in detail about embodiments of the present invention, with reference to the drawings. Radio communication methods according to respective embodiments may be applied singularly or applied in combination.

gNB may be replaced with a radio base station, a network, a transmission/reception point, or the like.

UE may specify a PUCCH resource by using a CCE index of a PDCCH that satisfies a given selection condition from a plurality of PDCCHs.

UE may determine a PUCCH resource by using at least one of ARI and aggregation level in addition to the CCE index of the PDCCH. Multiple PUCCH resource candidates may be associated with multiple CCE index values, or a plurality of PUCCH resource candidates may be associated with multiple combinations of a CCE index value and another parameter value, respectively.

ARI may be indicated by another field in DCI (for example, transmission power control field). ARI may be associated with a PUCCH resource of another cell.

the gNB may determine at least PCCH CCE index and a corresponding PUCCH resource based on the method for determining a PUCCH resource in UE. This makes it possible to prevent an increase in overhead of PUCCH resource signaling and also possible to configure a PUCCH resource flexibly.

Embodiment 1

Embodiment 1 treats the case in which a plurality of PDCCHs are configured in the time direction, the plural PDCCHs schedule a plurality of PDSCHs, respectively, and the UE sends back ACK/NACK for the plural PDSCHs. UE may perform bundling of ACK/NACKs for the plural PDSCHs, or may not do so. A plurality of PUCCH resources may be configured for the plural PDSCHs, respectively, or one PUCCH resource may be configured for the plural PDSCHs.

Embodiment 1-1

The UE specifies a PUCCH resource by using a CCE index of the first PDCCH. The selection condition here may be that the PDCCH should be the first PDCCH in the time direction. This CCE index may be associated with one PUCCH resource candidate, or combination of this CCE index and another parameter may be associated with one PUCCH resource candidate. The other parameter may be at least one of ARI in DCI carried on the PDCCH and an aggregation level.

Figure 3:
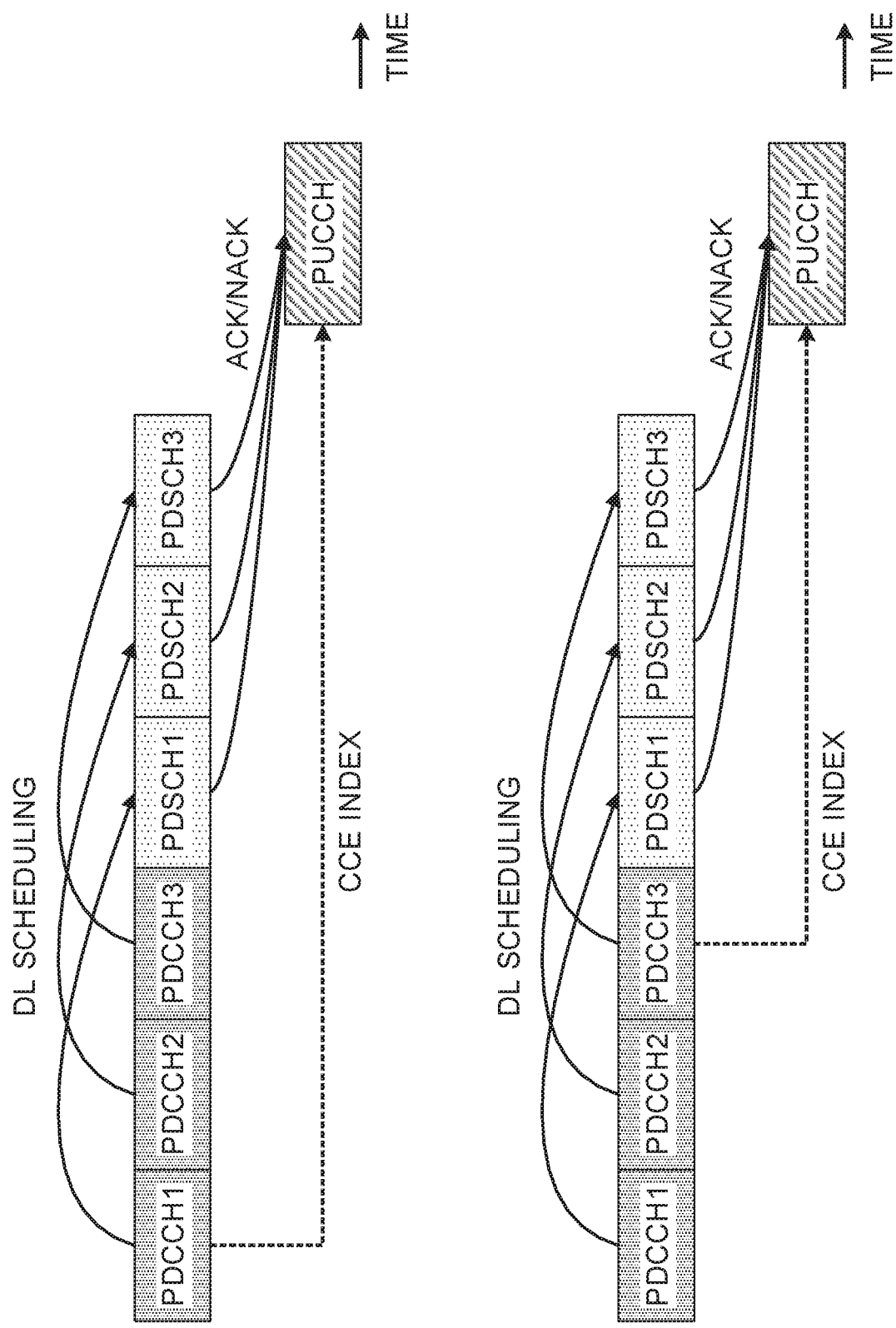
FIGS. 3A and 3B provide diagrams each illustrating an example of a PUCCH resource determining method according to aspect 1.

FIG. 3A illustrates the case where PDCCHs 1, 2 and 3 are subjected to TDM (time Division Multiplexing). PDCCHs 1, 2 and 3 schedule PDSCHs 1, 2 and 3, respectively. The UE determines a PUCCH resource candidate associated with a CCE index of PDCCH 1 that is the first PDCCH, as a PUCCH resource for ACK/NACKs for PDSCHs 1, 2 and 3.

The plural PDCCHs each may include an ARI, or at least first PDCCH of the plural PDCCHs may include an ARI. ARIs in the plural PDCCHs may be the same value or be different values.

According to this embodiment, it is possible to make sufficient time for the UE to perform blind decoding of PDCCH, get a CCE index and specify the PUCCH resource. This makes it possible to take time for other processing.

Embodiment 1-2

The UE specifies a PUCCH resource by using a CCE index of the last PDCCH in the time direction. The selection condition here may be that the PDCCH should be the last PDCCH in the time direction. The CCE index may be associated with one PUCCH resource candidate, or combination of the CCE index and another parameter may be associated with a PUCCH resource candidate. The other parameter may be at least one of an ARI in DCI carried on the PDCCH and an aggregation level.

FIG. 3B illustrates the case where PDCCHs 1, 2 and 3 are subjected to TDM. PDCCHs 1, 2 and 3 schedule PDSCHs 1, 2 and 3, respectively. The UE determines a PUCCH resource candidate associated with a CCE index of PDCCH 3 that is the last PDCCH, as a PUCCH resource for ACK/NACKs of PDSCHs 1, 2 and 3.

Each of the plural PDCCHs may include an ARI or at least the last PDCCH of the plural PDCCHs may include an ARI. ARIs in the plural PDCCHs may be the same value or may be different values.

According to this embodiment, gNB is able to configure a PUCCH resource immediately before, and therefore, the eNB is able to perform PUCCH resource allocation more flexibly, while taking into consideration PUCCH resource allocation of other UEs. This makes it possible to prevent the probability of collision of PUCCH resources.

Embodiment 2

Embodiment 2 treats the case where a plurality of PDCCHs are configured in the frequency direction or in the component carrier (CC) direction, the plural PDCCHs schedule a plurality of PDCCHs, respectively, and the UE sends back ACK/NACKs for the plural PDSCHs. The UE may perform bundling of ACK/NACKs for the plural PDSCHs, or may not do so. A plurality of PUCCH resources may be configured for the plural PDSCHs, or one PUCCH resource may be configured for the plural PDSCHs.

Embodiment 2-1

When a plurality of PDCCHs are configured in respective CCs, the UE specifies a PUCCH resource by using a CCE index of a PDCCH of the primary CC. The selection condition here may be that the CC of the PDCCH should be the primary CC (primary cell). The CCE index may be associated with one PUCCH resource candidate or combination of the CCE index with another parameter may be associated with one PUCCH resource candidate. The other parameter may be at least one of an ARI in DCI carried on the PDCCH and an aggregation level.

Figure 4:
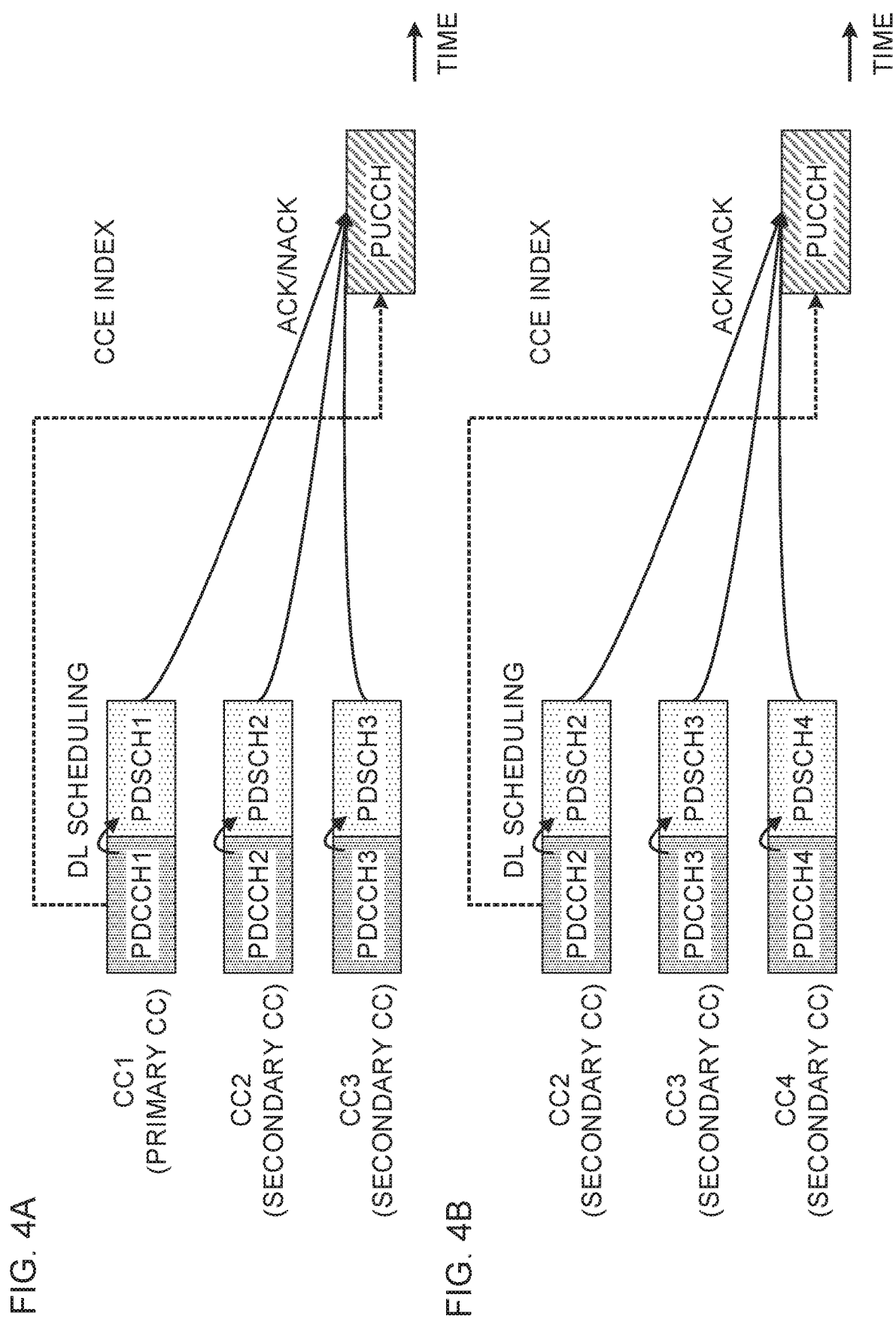
FIGS. 4A and 4B provide diagrams each illustrating an example of a PUCCH resource determining method according to aspect 2.

FIG. 4A illustrates the case where scheduling is performed in CC1 as a primary cell (CC index=1), CC2 as a secondary CC (CC index=2) and CC2 as a secondary CC (CC index=3). CC1, CC2 and CC3 are configured with PDCCHs 1, 2 and 3, respectively. PDCCHs 1, 2 and 3 schedule PDSCHs 1, 2 and 3, respectively.

UE determines a PUCCH resource candidate associated with a CCE index of PDCCH 1 of CC1 that is the primary CC, as a PUCCH resource for ACK/NACKs for PDSCHs 1, 2 and 3.

The plural PDCCHs each may include an ARI, or at least the PDCCH of the primary CC out of the plural PDCCHs may include an ARI. ARIs in the plural PDCCHs may be the same value or may be different values.

According to this embodiment, even when connection with the secondary CC is lost, the UE is able to specify a PUCCH resource. In this case, the gNB is able to configure the PUCCH resource as long as the UE is able to read the PDCCH of the primary CC.

Embodiment 2-2

When a plurality of PDCCHs are configured in respective CCs, the UE specifies a PUCCH resource by using a CCE index of the PDCCH of a CC that satisfies a given selection condition. This CCE index may be associated with one PUCCH resource candidate or combination of the CCE index with another parameter may be associated with one PUCCH resource candidate. The other parameter may be at least one of an ARI in DCI carried on the PDCCH and an aggregation level.

For example, the selection condition may be that the CC of the PDCCH (CC scheduled by the PDCCH) should have the smallest CC index or the CC configured with the PDCCH (CC scheduled by the PDCCH) should have the greatest CC index.

FIG. 4B illustrates the case where PDCCs 2, 3 and 4 are configured in CC2 as the secondary CC (CC index=2). CC # as the secondary CC (CC index=3) and CC4 as the secondary CC (CC index=4). PDCCHs 2, 3 and 4 schedule PDSCHs 2, 3 and 4, respectively.

The selection condition in the example of this figure is that the CC configured with the PDCCH should have the smallest CC index. The UE determines a PUCCH resource candidate associated with the CCE index of PDCCH 2 of CC2 having the smallest CC index, as a PUCCH resource for ACK/NACKs for PDSCHs 2, 3 and 4.

The plural PDCCHs each may include an ARI or at least the PDCCH of a CC that satisfies the selection condition out of the plural PDCCHs may include an ARI. ARIs in the plural PDCCHs may be the same value or may be different values.

According to this aspect, if connect ion with a part of CCs is lost, the UE is able to specify the PUCCH resource.

Embodiment 3

Embodiment 3 treats the case where a plurality of PDCCHs are configured in the spatial direction, the plural PDCCHs schedule a plurality of PDSCHs, respectively, and the UE sends back ACK/NACKs for the plural PDSCHs. The UE may perform bundling of ACK/NACKs of the plural PDSCHs, or may not do so. A plurality of PUCCH resources may be configured for the plural PDSCHs, or one PUCCH resource may be configured for the plural PDSCHs.

The UE specifies a PUCCH resource by using a CCE index of a PDCCH that satisfies a given selection condition. The CCE index may be associated with one PUCCH resource candidate, or combination of the CCE index with another parameter may be associated with one PUCCH resource candidate. The other parameter may be at least one of an ARI in DCI carried on the PDCCH and an aggregation level.

For example, the selection condition may be that the layer of the PDCCH should have the smallest spatial (Multi-Input Multi-Output (MIMO) layer) order. The selection condition may be that the layer of the PDCCH should have the smallest layer index.

Figure 5:
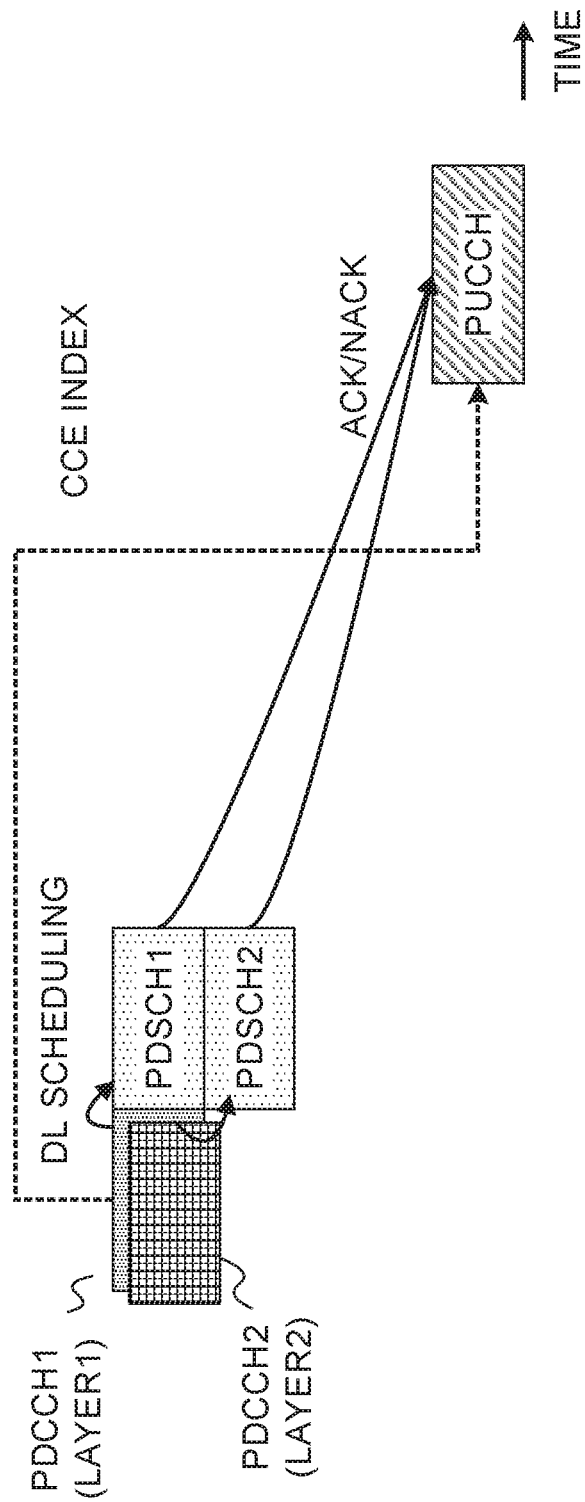
FIG. 5 is a diagram illustrating an example of a PUCCH resource determining method according to aspect 3.

FIG. 5 illustrates layers 1 and 2 configured as the MIMO layers. PDCCHs 1 and 2 are configured in layers 1 and 2, respectively. PDCCHs 1 and 2 schedule PDSCHs 1 and 2, respectively.

The UE determines a PUCCH resource candidate associated with the CCE index of PDCCH 1 of layer 1 having the smallest layer index, as a PUCCH resource for ACK/NACKs of PDSCHs 1 and 2.

Further, when different numbers of layers are spatially multiplexed in the plural CCs, the selection condition may be that the layer of the PDCCH should have the smallest layer index in a CC having the smallest number of layers.

The plural PDCCHs may each include an ARI, or a PDCCH that at least satisfies the selection condition out of the plural PDCCHs may include an ARI. ARIs in the plural PDCCHs may be the same values or may be different values.

According to this embodiment, even when a plurality of layers are configured, the UE is able to specify a PUCCH resource. Besides, the UE is able to specify a PUCCH resource by using the CCE index of the PDCCH of a layer having the best reliability, thereby to assure high reliability.

Embodiment 4

Embodiment 4 treats the case where a plurality of CORESETs are configured, the plural CORESETs include respective PDCCHs, the plural PDCCHs schedule respective PDSCHs and the UE sends ACK/NACKs for the plural PDSCHs. The UE may perform bundling o ACK/NACKs for the plural PDSCHs, or may not do so. A plurality of PUCCH resources may be configured for the plural PDSCHs, respectively, or one PUCCH resource may be configured for the plural PDSCHs.

The UE specifies a PUCCH resource by using a CCE index of the PDCCH in the CCRESET that satisfies the given selection condition. The CCE index may be associated with one PUCCH resource candidate, or combination of the CCE index with another parameter may be associated with one PUCCH resource candidate. The other parameter may be at least one of an ARI in DCI carried on the PDCCH and an aggregation level.

For example, the selection condition may be that the CORESET of the PDCCH should have the lowest CORESET index or it should have the lowest CORESET index among CORESETs including UE-specific search spaces.

Figure 6:
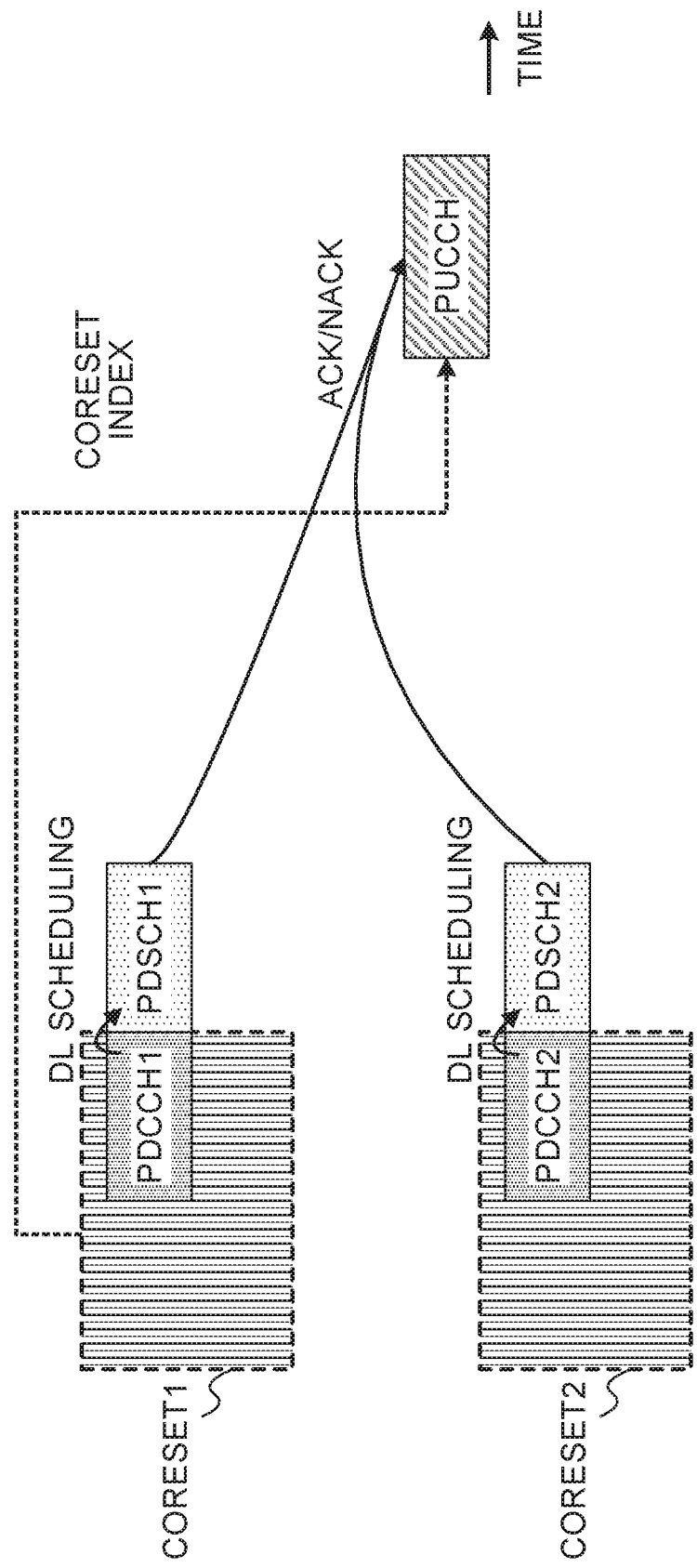
FIG. 6 is a diagram illustrating an example of a PUCCH resource determining method according to aspect 4.

FIG. 6 illustrates the case where CORESETs 1 and 2 are configured. PDCCHs 1 and 2 are configured in CORESETs 1 and 2, respectively. PDCCHs 1 and 2 schedule PDSCHs 1 and 2, respectively.

The UE determines a PUCCH resource candidate associated with the CCE index of PDCCH 1 of CORESET having the smallest CORESET index, as a PUCCH resource for ACK/NACKs for PDSCHs 1 and 2.

The plural PDCCHs each may include an ARI or the PDCCH in that CORESET that at least satisfies the selection condition among the plural PDCCHs may include an ARI. ARIs in the plural PDCCHs may be the same value or different value.

According to this aspect, even when the plural CORESETs are configured, the UE is able to specify a PUCCH resource.

(Radio Communication System)

Now, the structure of a radio communication system according to one embodiment of the present invention will be described below. In this radio communication system, communication is performed using a combination of at least one of a plurality of aspects that have been described above.

Figure 7:
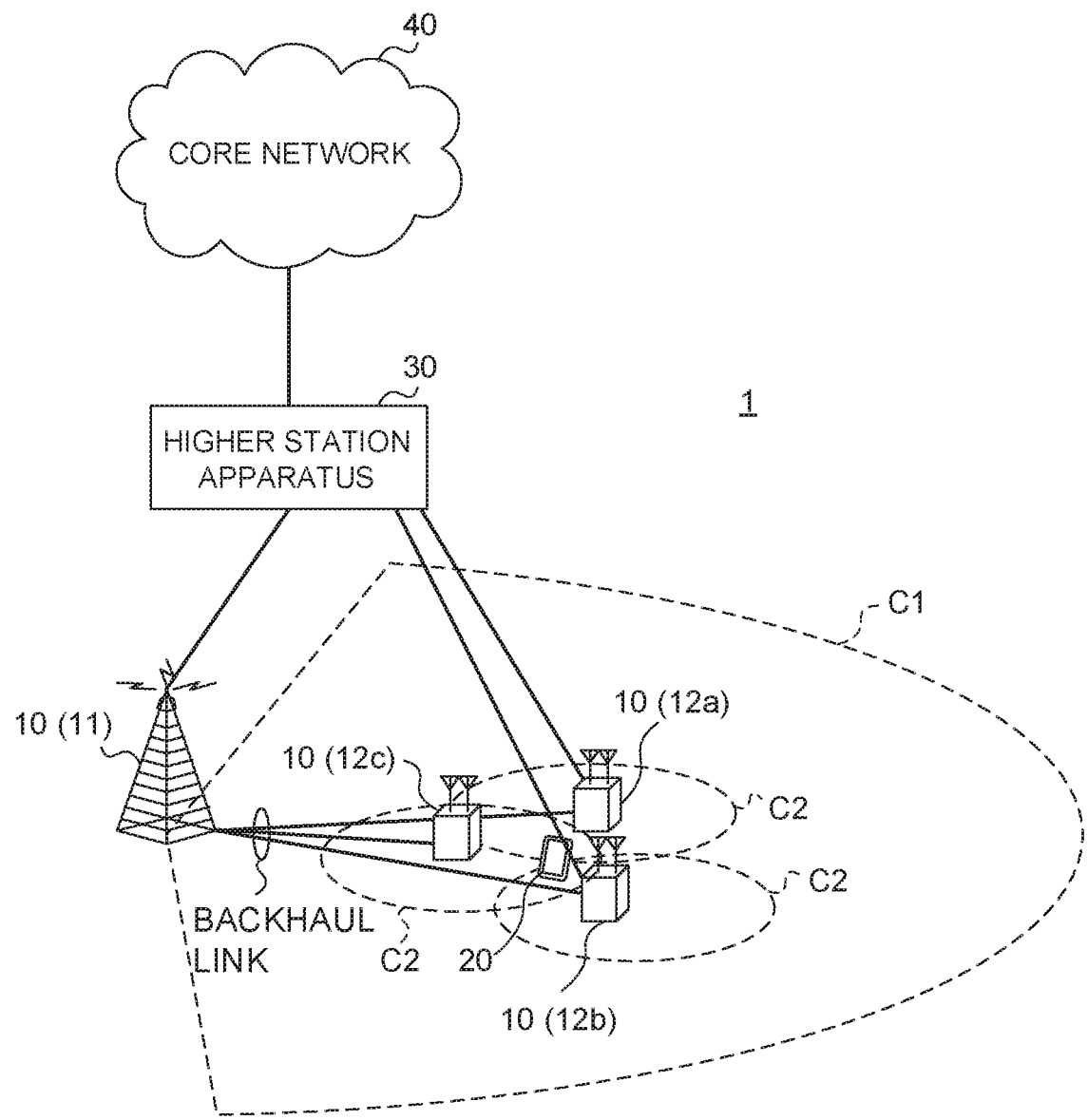
FIG. 7 is a diagram illustrating an example of a schematic structure of a radio communication system according to one embodiment of the present invention.

FIG. 7 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1, and radio base stations 12 (12a to 12c) that are placed within the macro cell C1 and that form small cells C2, which are narrower than the macro cell C1. Also, user terminals 20 are placed in the macro cell C1 and in each small cell C2. The arrangements of each cell and user terminals 20 are not limited to those illustrated in the drawing.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmission/reception point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmission/reception points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that, uplink and downlink radio access schemes are not limited to these combinations, and other radio access schemes may be used.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information, SIBs (System Information Blocks) and so on are communicated in the PDSCH. Also, the MIB (Master Information Block) is communicated in the PBCH.

The downlink L1/L2 control channels include a downlink control channel (PDCCH (Physical Downlink Control CHannel)) and/or an EPDCCH (Enhanced Physical Downlink Control CHannel), a PCFICH (Physical Control Format Indicator CHannel), and a PHICH (Physical Hybrid-ARQ Indicator CHannel). The PDCCH communicates downlink control information (DCI) that includes PDSCH and PUSCH scheduling information, and so on. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

(Radio Base Station)

Figure 8:
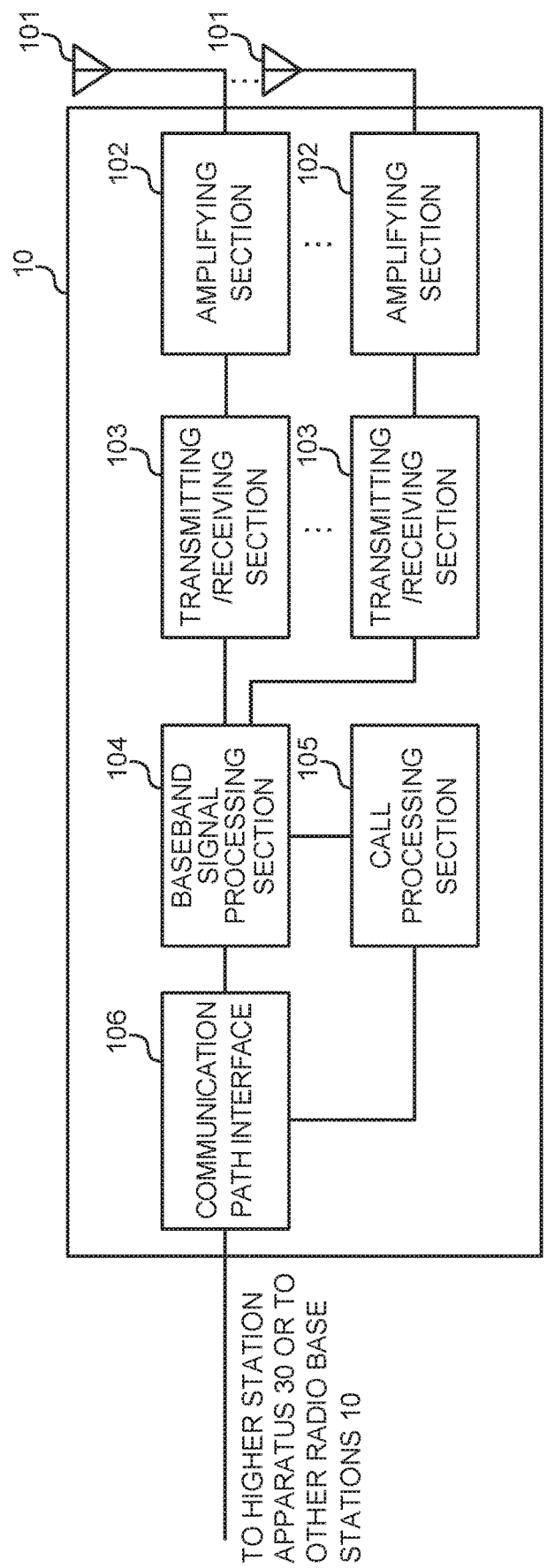
FIG. 8 is a diagram illustrating an example of an overall structure of a radio base station according to one embodiment of the present invention.

FIG. 8 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105, and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as configuration and release of communication channels), manages the state of the radio base stations 10 and manages the radio resources.

The communication path interface section 106 transmits and receives signals to and from the higher station apparatus 30 via a given interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Figure 9:
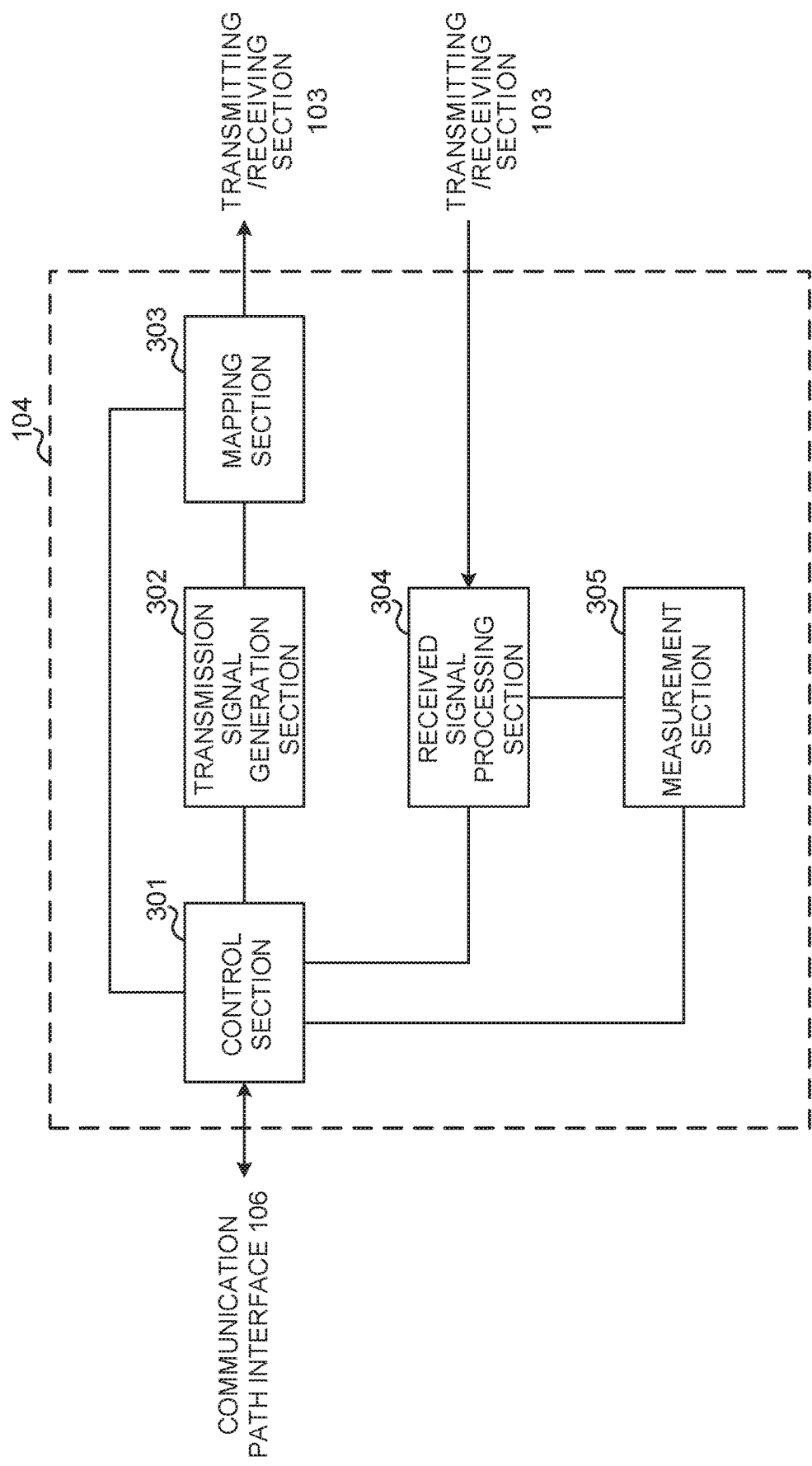
FIG. 9 is a diagram illustrating an example of a functional structure of a radio base station according to one embodiment of the present invention.

FIG. 9 is a diagram to show an example of a functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH). Also, the control section 301 controls the generation of downlink control signals (for example, delivery acknowledgement information), downlink data signals and so on, based on the results of deciding whether or not retransmission control is necessary for uplink data signals, and so on. The control section 301 controls the scheduling of synchronization signals (for example, PSS (Primary Synchronization Signal)/SSS (Secondary Synchronization Signal)), downlink reference signals (for example, CRS, CST-RS, DMRS, etc.), and so on.

The control section 301 controls scheduling of uplink data signals (for example, signals transmitted on PUSCH), uplink control signals (for example, signals transmitted on PUCCH and/or PUSCH), random access preambles transmitted on PRACH, uplink reference signals, and so on.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which signal downlink signal allocation information, and UL grants, which signal uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to given radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

(User Terminal)

Figure 10:
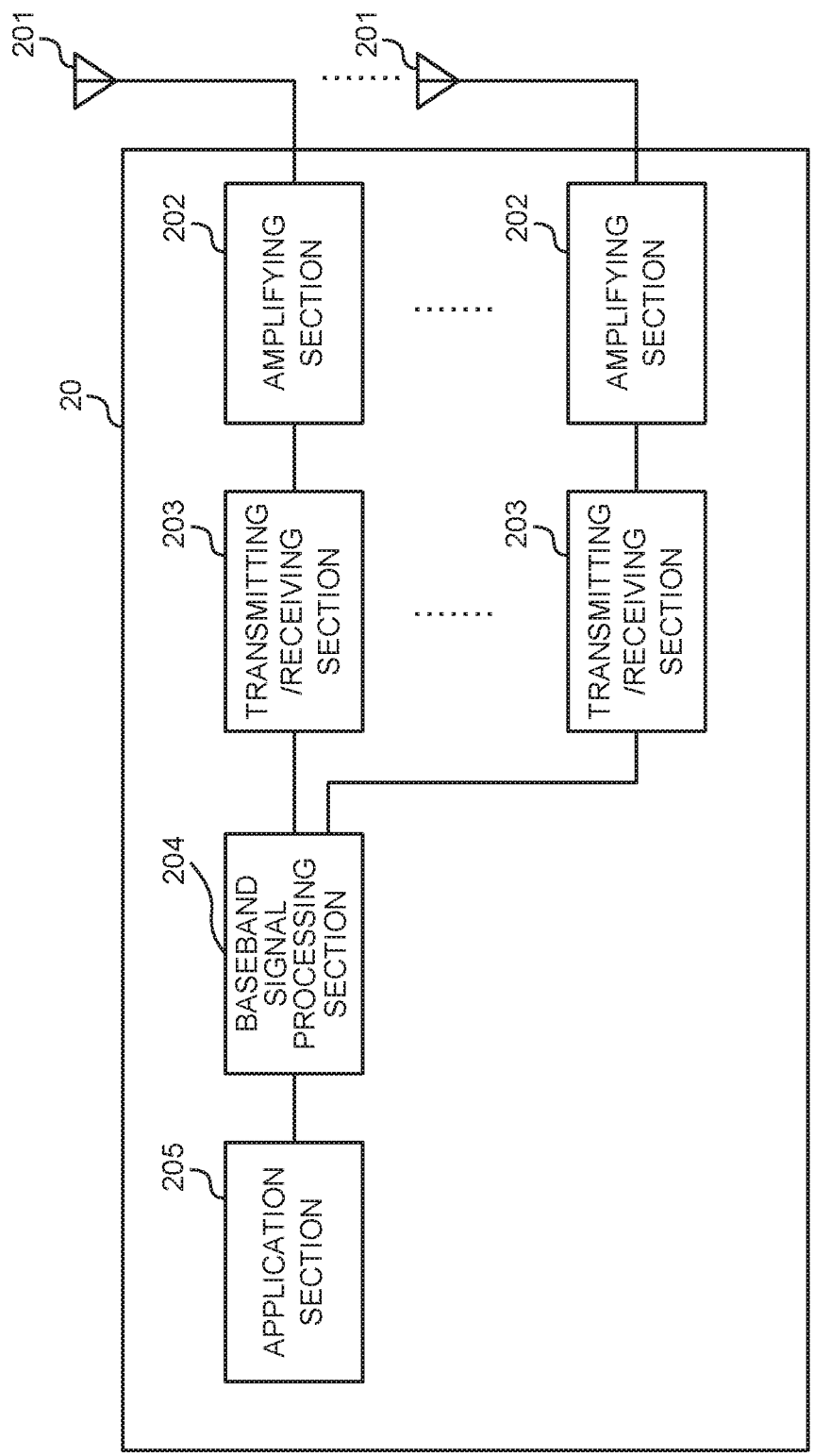
FIG. 10 is a diagram illustrating an example of an overall structure of a user terminal according to one embodiment of the present invention.

FIG. 10 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs receiving processes for the baseband signal that is input, including an FFT process, error correction decoding, a retransmission control receiving process and so on. Downlink user data is forwarded to the application section 205. The application section 205 performs processes related to higher layers above the physical layer and the MAC layer, and so on. In the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Figure 11:
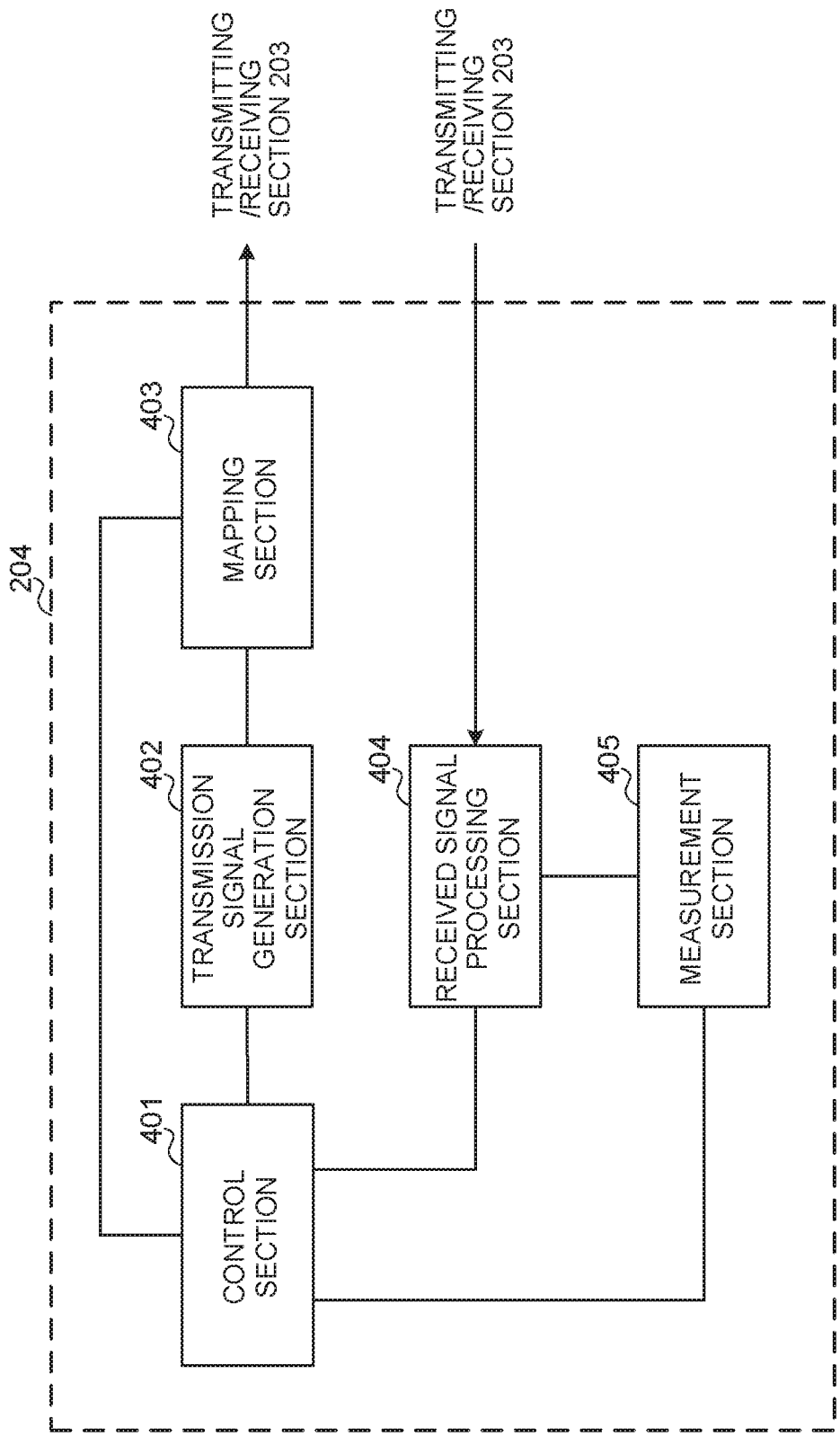
FIG. 11 is a diagram illustrating an example of a functional structure of a user terminal according to one embodiment of the present invention.

FIG. 11 is a diagram to show an example of a functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (for example, signals transmitted on PDCCH/EPDCCH) and downlink data signals (for example, signals transmitted on PDSCH) transmitted from the radio base station 10, via the received signal processing section 404. The control section 401 controls the generation of uplink control signals (for example, delivery acknowledgement information and so on) and/or uplink data signals based on the results of deciding whether or not retransmission control is necessary for the downlink control signals and/or downlink data signals, and so on.

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present disclosure pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is signaled from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmit ting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. For example, the measurement section 405 conducts measurements using downlink reference signals transmitted from the radio base station 10. The measurement section 405 can be constituted by a measurer, a measurement circuit or measurement apparatus that can be described based on general understanding of the technical field to which the present invention pertains.

In addition, the control section 401 may determine an uplink control channel (for example, PUCCH) resource for data based on a control channel element (for example, CCE) index of one downlink control channel (for example, PDCCH) that satisfies a given condition (for example, selection condition) among a plurality of downlink control channels (for example, PDCCHs).

Further, a plurality of downlink control channels may be arranged in the time dimension. The control section 401 may determine an uplink control channel resource based on a control channel element index of the first downlink control channel or the last downlink control channel among the plurality of downlink control channels (Aspect 1).

Furthermore, the plurality of downlink control channels may be arranged in the frequency dimension. The condition may be a condition of layers (for example, MIMO layers) where the plurality of downlink control channels are allocated respectively (Aspect 2).

Yet furthermore, the plurality of downlink control channels may be arranged in the spatial dimension. The condition may be a condition of layers (for example, MIMO layers) where the plurality of downlink control channels are allocated respectively (Aspect 3).

Yet furthermore, the plurality of downlink control channels may be arranged in a plurality of control resource sets (for example, CORESETs). The condition may be a condition of control resource sets where the plurality of downlink control channels are allocated respectively (Aspect 4).

(Hardware Structure)

Note that the block diagrams that have been used to describe the above embodiments show blocks in functional units. These functional blocks (components) may be implemented in arbitrary combinations of hardware and/or software. Also, the method or means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

That is, a radio base station, a user terminal and so on according to one embodiment of the present invention may function as a computer that executes the process of the radio communication method of the present invention.

Figure 12:
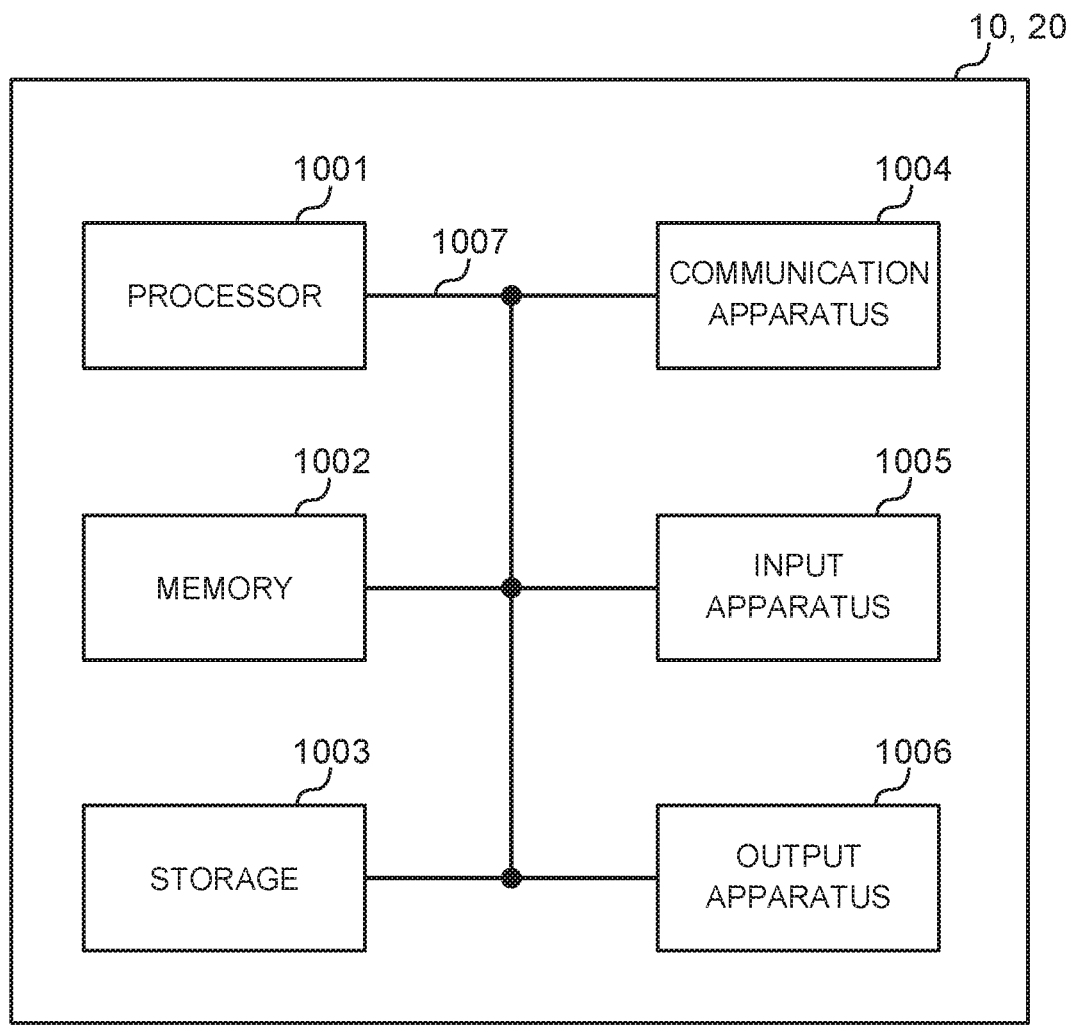
FIG. 12 is a diagram illustrating an example of a hardware structure of a radio base station and a user terminal according to one embodiment of the present invention.

FIG. 12 is a diagram to show an example of a hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

Each function of the radio base station 10 and the user terminal 20 is implemented by reading given software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and/or the like for implementing the radio communication methods according to one embodiment.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval (TTI)," or a plurality of consecutive subframes may be referred to as a "TTI," or one slot or mini-slot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), codeblocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or multiple slots or one or more minislots) may be the minimum time unit of scheduling. Also, the number of slots (the number of min-islots) to constitute this minimum time unit of scheduling may be controlled.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "frac-tional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, one RE may be a radio resource region of one subcarrier and one symbol.

Note that the structures of radio frames, subframes, slots, minislots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to given values, or may be represented using other applicable information. For example, a radio resource may be specified by a given index. Further, mathematical expressions using these parameters may be different from those explicitly disclosed herein.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Signaling of information is by no means limited to the aspects/embodiments described in this specification, and other methods may be used as well. For example, signaling of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be signaled using, for example, MAC control elements (MAC CEs (Control Elements)).

Also, signaling of given information (for example, signaling of information to the effect that "X holds") does not necessarily have to be sent explicitly, and can be sent implicitly (for example, by not signaling this piece of information, by signaling another piece of information, and so on).

Decisions may be made in values represented by one bit (0 or 1), may be made in Boolean values that represent true or false, or may be made by comparing numerical values (for example, comparison against a given value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these v/ired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. Also, the order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband)/IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access. As used herein, when two elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

(Additional Notes)
[Configuration 1]
A user terminal comprising:
a receiving section that receives a plurality of downlink control channels for scheduling data; and
a control section that determines an uplink control channel resource for the data based on a control channel element index of one downlink control channel that satisfies a given condition of the plurality of downlink control channels.
[Configuration 2]
The user terminal according to claim 1, wherein the plurality of downlink control channels are allocated in a time direction, and the control section determines the uplink control channel resource based on the control channel element index of a first downlink control channel or a last downlink control channel of the plurality of downlink control channels.
[Configuration 3]
The user terminal according to claim 1, wherein the plurality of downlink control channels are allocated in a frequency direction, and the condition is a condition of frequency resources where the plurality of downlink control channels are allocated respectively.
[Configuration 4]
The user terminal according to claim 1, wherein the plurality of downlink control channels are allocated in a spatial direction and the condition is a condition of layers where the plurality of downlink control channels are allocated respectively.
[Configuration 5]
The user terminal according to claim 1, wherein the plurality of downlink control channels are allocated in a plurality of control resource sets, respectively, and the condition is a condition of the control resource sets where the plurality of downlink control channels are allocated respectively.
[Configuration 6]
A radio communication method for a user terminal comprising:
receiving a plurality of downlink control channels for scheduling data; and
determining an uplink control channel resource for the data based on a control channel element index of one downlink control channel that satisfies a given condition of the plurality of downlink control channels.

The disclosure of Japanese Patent Application No. 2017-241134, filed on Nov. 29, 2017, including the specification, drawings and abstract, is incorporated herein by reference in its entirety.

The invention claimed is:
1. A terminal comprising:
a receiver that receives multiple downlink control information for scheduling downlink shared channels in a plurality of downlink control channels; and
a processor that determines an uplink control channel resource for hybrid automatic repeat request acknowledgements (HARQ-ACKs) based on a control channel element (CCE) index of a downlink control channel corresponding to a specific downlink control information responsive to determining that the HARQ-ACKs for the downlink shared channels is transmitted in a same slot,
wherein the uplink control channel resource is based on a resource indication field in the specific downlink control information, and
wherein the specific downlink control information is a last downlink control information in a cell index ascending order of some last downlink control information in a time domain index ascending order of the multiple downlink control information.
2. The terminal according to claim 1, wherein the CCE index is a starting CCE index of the downlink control channel corresponding to the specific downlink control information.
3. A communication method for a terminal comprising:
receiving multiple downlink control information for scheduling downlink shared channels in a plurality of downlink control channels; and
determining an uplink control channel resource for hybrid automatic repeat request acknowledgements (HARQ-ACKs) based on a control channel element (CCE) index of a downlink control channel corresponding to a specific downlink control information responsive to determining that the HARQ-ACKs for the downlink shared channels is transmitted in a same slot,
wherein the uplink control channel resource is based on a resource indication field in the specific downlink control information, and
wherein the specific downlink control information is a last downlink control information in a cell index ascending order of some last downlink control information in a time domain index ascending order of the multiple downlink control information.

4. A base station comprising:

a processor that determines a control channel element (CCE) index of a downlink control channel corresponding to a specific downlink control information and a resource indication field in the specific downlink control information responsive to determining that hybrid automatic repeat request acknowledgements (HARQ-ACKs) for downlink shared channels is transmitted in a same slot; and a transmitter that transmits multiple downlink control information for scheduling the downlink shared channels in a plurality of downlink control channels, wherein the CCE index and the resource indication field are based on an uplink control channel resource for the HARQ-ACKs, and wherein the specific downlink control information is a last downlink control information in a cell index ascending order of some last downlink control information in a time domain index ascending order of the multiple downlink control information.

5. A system comprising:

a terminal that comprises:

a receiver that receives multiple downlink control information for scheduling downlink shared channels in a plurality of downlink control channels; and a processor that determines an uplink control channel resource for hybrid automatic repeat request acknowledgements (HARQ-ACKs) based on control channel element (CCE) index of a downlink control channel corresponding to a specific downlink control information responsive to determining that the HARQ-ACKs for the plurality of downlink shared channels is transmitted in a same slot; and a base station that transmits the multiple downlink control information, wherein the uplink control channel resource is based on a resource indication field in the specific downlink control information, and wherein the specific downlink control information is a last downlink control information in a cell index ascending order of some last downlink control information in a time domain index ascending order of the multiple downlink control information.

* * * * *